United States Patent
Komatsubara

(10) Patent No.: US 12,229,729 B2
(45) Date of Patent: Feb. 18, 2025

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Keisuke Komatsubara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 485 days.

(21) Appl. No.: 17/155,098

(22) Filed: Jan. 22, 2021

(65) Prior Publication Data

US 2022/0058585 A1 Feb. 24, 2022

(30) Foreign Application Priority Data

Aug. 20, 2020 (JP) .................................. 2020-139047

(51) Int. Cl.
*G06Q 10/109* (2023.01)
*H04L 51/224* (2022.01)
*H04L 67/55* (2022.01)
*H04W 4/02* (2018.01)

(52) U.S. Cl.
CPC ......... *G06Q 10/109* (2013.01); *H04L 51/224* (2022.05); *H04L 67/55* (2022.05); *H04W 4/02* (2013.01)

(58) Field of Classification Search
None
See application file for complete search history.

(56) References Cited

U.S. PATENT DOCUMENTS

| | | | |
|---|---|---|---|
| 2006/0283938 A1* | 12/2006 | Kumar | G06K 17/00 235/382 |
| 2011/0158207 A1* | 6/2011 | Alberth, Jr. | G06Q 10/109 370/338 |
| 2013/0057906 A1* | 3/2013 | Hosoda | H04N 1/00204 358/1.15 |
| 2015/0154524 A1* | 6/2015 | Borodow | H04W 4/029 705/7.23 |
| 2016/0092734 A1* | 3/2016 | Loce | G06V 40/23 382/103 |
| 2019/0295200 A1* | 9/2019 | Girgensohn | G06F 16/5846 |
| 2021/0287527 A1* | 9/2021 | Kashiwabara | G08C 17/02 |

FOREIGN PATENT DOCUMENTS

| | | |
|---|---|---|
| JP | 2011070642 | 4/2011 |
| JP | 2018034310 | 3/2018 |
| JP | 2019114935 | 7/2019 |

OTHER PUBLICATIONS

"Office Action of Japan Counterpart Application", issued on Feb. 27, 2024, with English translation thereof, pp. 1-8.

* cited by examiner

*Primary Examiner* — William L Bashore
*Assistant Examiner* — Gabriel Mercado
(74) *Attorney, Agent, or Firm* — JCIPRNET

(57) ABSTRACT

An information processing apparatus includes a processor configured to try to collect information from a terminal carried by a user, and control notification to the user based on information related to a behavior of the user in a case where the information is not collected from the terminal.

7 Claims, 5 Drawing Sheets

FIG. 3

| EMPLOYEE ID | SENSOR TERMINAL IDENTIFIER (BD ADDRESS) | PREVIOUS DATA COMMUNICATION METHOD | PREVIOUS DATA RECEPTION TIME | NOTIFICATION DESTINATION | SCHEDULE INFORMATION |
|---|---|---|---|---|---|
| A | 11:22:33:aa:bb:cc | LAN (DIRECT) 192.168... | 12/17 : 15:00 | aaa.domain.co.jp | NO |
| B | 11:* | BLE (DIRECT) | 12/16 : 17:00 | bbb.domain.co.jp | NO |
| C | 11:* | LAN (RELAY) 192.168... | 12/17 : 9:00 | ccc.domain.co.jp | CONFERENCE |
| D | 11:* | BLE (RELAY) | 12/17 : 15:00 | ddd.domain.co.jp | NO |

FIG. 5

| CAUSE | SENSOR INFORMATION COLLECTION HISTORY OF CURRENT DAY | MULTIFUNCTION PERIPHERAL JOB HISTORY OF CURRENT DAY | SCHEDULE INFORMATION |
|---|---|---|---|
| ABSENT | HISTORY NOT PRESENT | HISTORY NOT PRESENT | ABSENT FOR WHOLE DAY |
| TEMPORARILY ABSENT | HISTORY PRESENT | HISTORY PRESENT | SCHEDULE PRESENT |
| UNABLE TO ACQUIRE WHILE NORMALLY ON DUTY | HISTORY PRESENT | HISTORY PRESENT | SCHEDULE NOT PRESENT | ns
INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-139047 filed Aug. 20, 2020.

BACKGROUND

(i) Technical Field

The present invention relates to an information processing apparatus and a non-transitory computer readable medium storing a program.

(ii) Related Art

A system that collects and analyzes information from terminals such as sensors at various locations via a network has been widely used along with development of Internet of things (IoT) technology. In addition, there is a system that collects information from moving terminals via a mobile phone network or other wide area networks.

A state notification apparatus disclosed in JP2018-034310A collects a state of a device such as a printing apparatus by short-range wireless communication such as Bluetooth (registered trademark) Low Energy (BLE) and determines whether or not error (for example, insufficiency of consumables) occurs in the device from the collected state. In a case where a determination that error has occurred is made, notification is performed.

JP2019-114935A discloses a mechanism for monitoring whether or not a relay terminal normally operates and detecting occurrence of anomaly in a system that collects sensor data from Internet of Things (IoT) terminals via the relay terminal. In this mechanism, a monitoring terminal detects an acquisition request form the relay terminal, and in a case where normality related to an acquisition operation corresponding to the acquisition request in the relay terminal is checked, transmits monitoring data to the relay terminal via a communication line. The monitoring data is relayed to a higher apparatus from the relay terminal in the same manner as the sensor data. A synthetic monitoring apparatus performs synthetic monitoring of whether the sensor data is normally collected on a communication path including the relay terminal based on a reception status of the monitoring data collected in the higher apparatus.

In addition, there is a case of collecting information from a mobile terminal such as a wearable device. In such a case, in a case where the terminal leaves outside a communicable range of an apparatus collecting information in a communication method such as BLE, information cannot be collected from the terminal.

SUMMARY

Transmission of notification for requesting reaction to a user of the terminal in a case where information cannot be collected from the terminal is considered. However, uniformly performing notification without considering circumstances of the user may cause inconvenience to the user due to notification such that the user is unnecessarily disturbed, or that a content of notification is difficult to understand by the user.

Aspects of non-limiting embodiments of the present disclosure relate to an information processing apparatus and a non-transitory computer readable medium storing a program that reduce inconvenience caused to a user of a terminal due to notification, compared to a method of uniformly notifying a user of a terminal from which information cannot be collected.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus comprising a processor configured to try to collect information from a terminal carried by a user, and control notification to the user based on information related to a behavior of the user in a case where the information is not collected from the terminal.

BRIEF DESCRIPTION OF THE DRAWINGS

Exemplary embodiment(s) of the present invention will be described in detail based on the following figures, wherein:

FIG. 3 is a diagram illustrating an example of management information managed by the edge device;

FIG. 5 is a diagram illustrating a rule for determining a cause of being unable to collect information from a sensor terminal.

DETAILED DESCRIPTION

Overall Configuration of System

Figure 1:
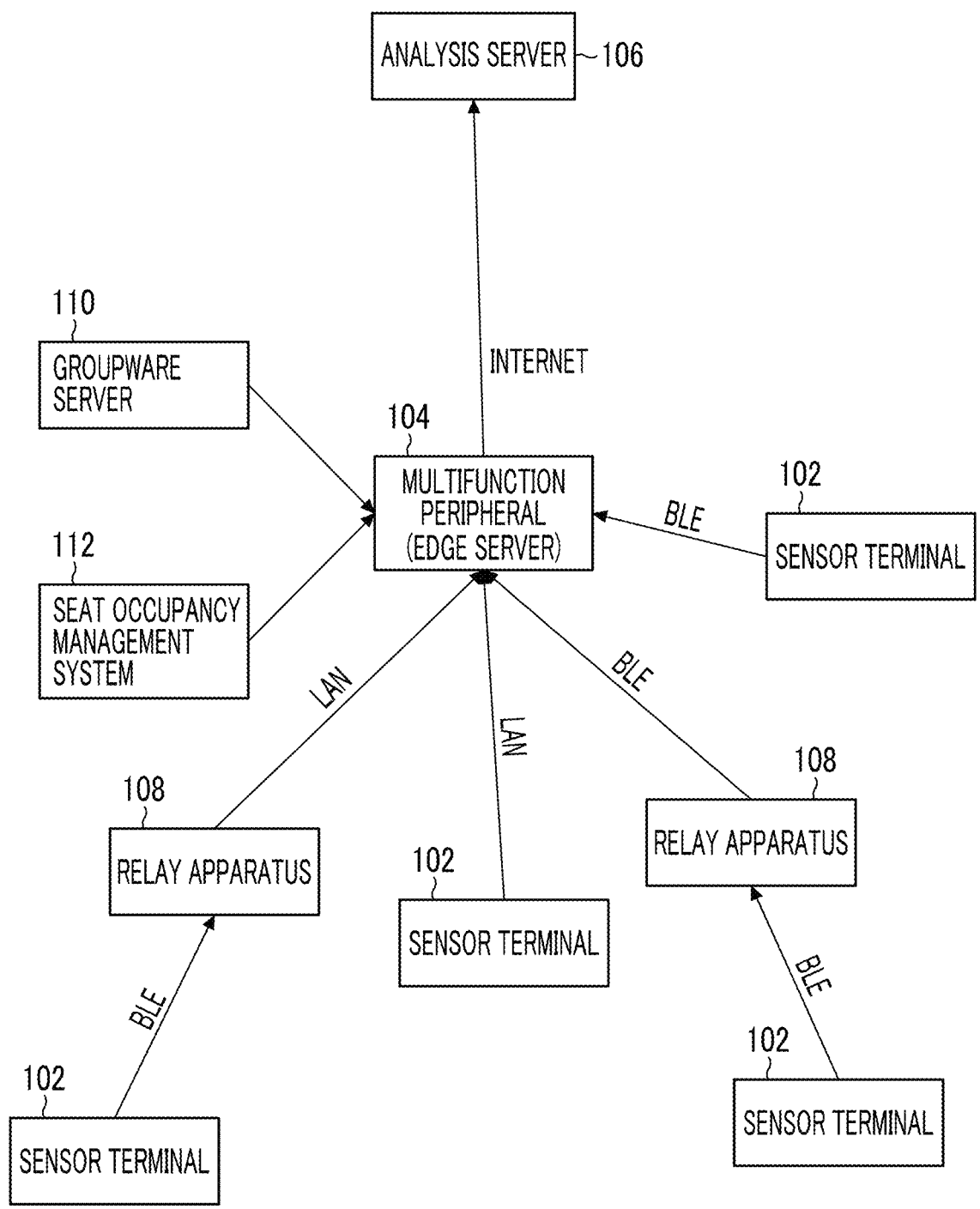
FIG. 1 is a diagram illustrating a system configuration of an exemplary embodiment.

FIG. 1 illustrates a system configuration of the present exemplary embodiment. The system in FIG. 1 collects data, that is, information, detected by a sensor terminal 102 carried by a user. For example, this system is assumed to be a system for managing health of employees working at an office.

In addition, in the example in FIG. 1, each individual user, that is, each individual employee of the office, carries the sensor terminal 102. In this example, the sensor terminal 102 is configured as a wearable terminal that is worn on a part of a body such as an arm or an ear. One or more sensors such as a heart rate sensor, a body temperature sensor, a brain wave sensor, and an electrocardiographic sensor detecting a state of the body are mounted on the sensor terminal 102. For example, these sensors incorporated in the sensor terminal 102 periodically measure the state of the body such as a heart rate and a body temperature of the user wearing the sensor terminal 102, and generate data indicating a measurement result. The sensor terminal 102 may calculate a secondary indicator value representing concentration, stress, and the like of the user from data of detection results of the incorporated sensors.

A multifunction peripheral 104 is installed in the office. The multifunction peripheral 104 is a multifunction apparatus having a printer, a scanner, a copier, a facsimile, an information processing function, and a network communication function. The multifunction peripheral 104 has a part that functions as an edge device of edge computing for an analysis server 106. Hereinafter, this functional part will be referred to as the edge device. The edge device collects detected data or calculated data of the sensor terminal 102 of each user in the office. In addition, the edge device executes a predetermined type of processing on the collected data and transmits processing result data obtained as a result of processing to the analysis server 106. The analysis server 106 receives data collected from the sensor terminal 102 of each user or a processing result of the data from the edge device among a plurality of the multifunction peripherals 104, analyzes the data, and provides various services in accordance with a result of analysis. For example, the analysis server 106 is provided on the Internet. In this case, the edge device transmits the collected data to the analysis server 106 via the Internet.

Collection of data from the sensor terminal 102 by the edge device is performed via a local area network (LAN) in the office or via proximity wireless communication such as BLE. For example, data from the sensor terminal 102 that has a BLE protocol for power saving and does not have a wireless LAN function such as Wi-Fi, or that is set to not use the wireless LAN function at all times is collected via BLE. Meanwhile, data from the sensor terminal 102 that is connected to the LAN in the office using the wireless LAN function is collected via the LAN.

Collection of data detected by the sensor terminal 102 may be performed via a relay apparatus 108. For example, in a case where a seat of the user carrying the sensor terminal 102 is far from the multifunction peripheral 104, and where the sensor terminal 102 is not connected to the LAN, data of the sensor terminal 102 is first passed to the relay apparatus 108 via BLE and transmitted to the multifunction peripheral 104 from the relay apparatus 108 via BLE or the LAN. In a case of using the relay apparatus 108, the user pairs the sensor terminal 102 of the user with the relay apparatus 108 in advance in order to enable BLE communication. For example, the relay apparatus 108 is a personal computer (PC), a smartphone, or a tablet terminal of the user.

The edge device can access servers such as a groupware server 110 and a seat occupancy management system 112 on a network such as the LAN in the office. The groupware server 110 is a system that manages a schedule of each user in the office. Schedule information of each user is registered in the groupware server 110. The seat occupancy management system 112 is a system that detects and manages whether the user is present in a seat of the user or in a room of the user, or a location at which the user is present in the office. The seat occupancy management system 112 may be a room entrance and exit management system that manages entrance and exit of the user for each location in accordance with a reading result of a sensor or an ID card reader disposed at an entrance and an exit of each location in the office. Alternatively, the seat occupancy management system 112 may detect whether or not the user is present in the seat of the user using a sensor disposed in the seat or the PC of the user. Alternatively, the seat occupancy management system 112 may be a system that detects the current location of the user by reading a wireless tag, an infrared tag, or the like carried by the user. The edge device can refer to information managed by these servers in order to determine whether or not the user is present in the office, or where the user is in the office.

Hardware Configuration of Multifunction Peripheral

Figure 2:
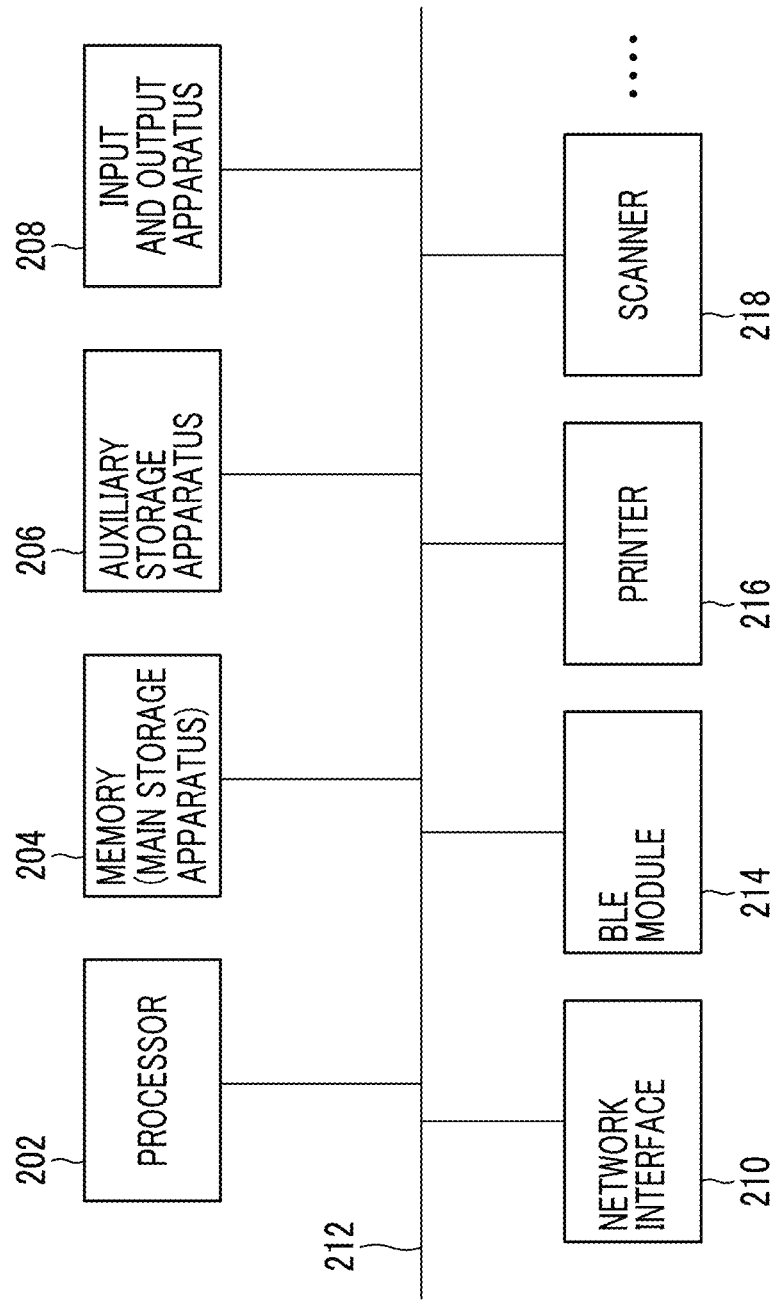
FIG. 2 is a diagram illustrating a hardware configuration of a multifunction peripheral having a function of an edge device.

One example of a basic portion of a hardware configuration of the multifunction peripheral 104 is illustrated in FIG. 2. As illustrated in FIG. 2, the multifunction peripheral 104, as hardware constituting an incorporated computer, has a circuit configuration in which a processor 202, a memory (main storage apparatus) 204 such as a random access memory (RAM), a controller controlling an auxiliary storage apparatus 206 that is a non-volatile storage apparatus such as a flash memory, a solid state drive (SSD), or a hard disk drive (HDD), an interface for various input and output apparatuses 208, a network interface 210 that performs a control for connecting to a network such as the local area network, and the like are connected via a data transfer path such as a bus 212. The network interface 210 may include a circuit for communication of a wireless LAN standard such as Wi-Fi. For example, the input and output apparatuses 208 include an input apparatus such as a touch panel that doubles as a display apparatus, and a voice output apparatus such as a speaker. The circuit configuration of the part described above may be the same as a general-purpose computer.

In addition, the multifunction peripheral 104 includes a BLE module 214, a printer 216, a scanner 218, and the like that are connected to computer hardware of the multifunction peripheral 104 via the bus 212 or the like. The BLE module 214 is a wireless communication module for short-range wireless communication complying with the BLE protocol. The printer 216 and the scanner 218 are mechanisms for copy, print, and scan functions of the multifunction peripheral 104.

The computer hardware part of the multifunction peripheral 104 executes processing for a user interface (UI), a control for information communication via the network or the like, a control for various functional elements such as the scanner, the printer, and the facsimile apparatus, information processing for an edge device function, and the like. A program in which contents of these various types of processing and controls are described is installed on the computer hardware via the network or the like and is stored in the auxiliary storage apparatus 206. An information processing apparatus of this exemplary embodiment is implemented by executing the program stored in the auxiliary storage apparatus 206 by the processor 202 using the memory 204.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The edge device in the multifunction peripheral 104 stores management information of each sensor terminal 102 that is a target for data collection. One example of this management information is illustrated in FIG. 3.

The management information illustrated in FIG. 3 includes items including an employee ID, a sensor terminal identifier, a previous data communication method, a previous data reception time, a notification destination, schedule information, and the like.

The employee ID is identification information of the user carrying the sensor terminal 102. The sensor terminal identifier is identification information of the sensor terminal 102 and is a BD address in the illustrated example. The BD address is identification information of a device compatible with Bluetooth and is information in the same format as a media access control (MAC) address.

The previous data communication method is a communication method used in a case of previously collecting data from the sensor terminal 102. For example, there are four data communication methods including "LAN (direct)", "BLE (direct)", "LAN (relay)", and "BLE (relay)". Here, "LAN (direct)" indicates that the edge device directly (that is, not via the relay apparatus 108) collects data from the sensor terminal 102 via the LAN. In a case of this method, information of an IP address of the sensor terminal 102 at a time of collection is also recorded in a field of the previous data communication method. In addition, "BLE (direct)" indicates that the edge device directly collects data from the sensor terminal 102 by BLE connection. In addition, "LAN (relay)" indicates that the edge device collects data from the sensor terminal 102 via the relay apparatus 108, and that the edge device communicates with the relay apparatus 108 via the LAN. In a case of this method, information of an IP address of the relay apparatus 108 at the time of collection is also recorded in the field of the previous data communication method. In addition, "BLE (relay)" indicates that the edge device collects data from the sensor terminal 102 via the relay apparatus 108, and that the edge device communicates with the relay apparatus 108 via BLE.

A normal data communication method may be included in the management information instead of or in addition to the previous data communication method. A normal location of the user in the office is generally decided like in a case where the seat of the user is fixed in the office. In a case where the normal location is decided, a data communication method that can be used for data collection from the sensor terminal 102 of the user present at the location is naturally decided. Accordingly, the normal data communication method is a predetermined data communication method for data communication with the sensor terminal 102 of the user present at the normal location.

For example, in a case where the normal location is sufficiently close to the edge device, using "BLE (direct)" as the data communication method is simple and saves power. In order to do, pairing the sensor terminal 102 with the multifunction peripheral 104 is useful. In a case where the location is far from the edge device (that is, communication cannot be directly performed using BLE), using "LAN (direct)" as the data communication method is simple in a case where the sensor terminal 102 can use a wireless LAN, and where power consumption of the wireless LAN is allowed. In this case, registering the IP address of the sensor terminal 102 in the edge device is useful. In a case where the location is far from the edge device, and where the sensor terminal 102 cannot use the wireless LAN from a viewpoint of an apparatus configuration or power consumption, any of "LAN (relay)" and "BLE (relay)" is used as the data communication method. In this case, an apparatus (for example, the PC at the seat of the user) near the normal location of the user is selected as the relay apparatus 108, and any of "LAN (relay)" and "BLE (relay)" is decided depending on whether a communication connection form between the relay apparatus 108 and the edge device is the LAN or BLE.

The previous data reception time is a reception time of data when the data is previously collected from the sensor terminal 102.

The notification destination is information indicating the notification destination in a case of notifying the user carrying the sensor terminal 102. In the illustrated example, an electronic mail address of the user is registered as the notification destination.

The schedule information is information indicating the current schedule of the user carrying the sensor terminal 102. This information is acquired from the groupware server 110. For example, for each predetermined time period, the edge device periodically reads the schedule of the user at the time from the groupware server 110 and registers the schedule in the management information. The edge device may read the schedule of the user at the time from the groupware server 110 when information of the current schedule of the user is necessary. In this case, the schedule information does not need to be included in the management information.

The edge device stores and manages information illustrated in FIG. 3 for each sensor terminal 102 managed by the edge device.

For example, the edge device periodically (for example, every hour) collects data from each sensor terminal 102 of a management target. In a case of collecting data from a certain sensor terminal 102, the edge device tries to collect data from the sensor terminal 102 using the same method as the "previous data communication method" of the sensor terminal 102 in the management information (refer to FIG. 3). For example, in a case where the previous data communication method is "BLE (direct)", the edge device tries to communicate with the sensor terminal 102 using BLE and collects data in a case where communication is successful. In addition, for example, in a case where the previous data communication method is "LAN (relay)", the edge device tries to communicate with the IP address recorded in the management information as a parameter of the method. In a case where communication is successful, the edge device notifies the BD address of the sensor terminal 102 to the apparatus of the IP address (that is, the relay apparatus 108 that is previously used) and requests the apparatus to collect data from the BD address. Data with which the relay apparatus 108 responds in accordance with the request is collected.

There are two cases where data cannot be collected from the sensor terminal 102 by communication using the previous data communication method. One is a case where communication connection cannot be made to the sensor terminal 102 (including a case where communication cannot be performed with the relay apparatus 108), and another one is a case where communication connection is made to the sensor terminal 102, and where the sensor terminal 102 does not have the most recent data corresponding to the current collection time. In the latter case, the sensor terminal 102 is considered to be abnormal. Thus, the edge device may record, in a database in the edge device, a possibility of occurrence of anomaly in the sensor terminal 102.

In the former case, the edge device, though not necessary, may try to collect data from the sensor terminal 102 using still another communication method. In this case, for example, the edge device may try four methods including "BLE (direct)", "LAN (direct)", "BLE (relay)", and "LAN (relay)" in a predetermined order. In a case of trying the "BLE (relay)" method, each relay apparatus 108 that is already paired with the edge device using BLE is requested to collect data from the sensor terminal 102. In a case of trying the "LAN (relay)" method, for example, the edge device requests each relay apparatus 108 on the LAN to collect data from the sensor terminal 102 by multicasting.

In a case where data cannot be collected from the sensor terminal 102 by either using the previous data communication method or additionally trying the other communication method, the previous data reception time in the management information remains not updated for the sensor terminal 102.

While illustration is not provided, the edge device stores the data collected from the sensor terminal 102 in the database in the edge device in association with the employee ID or the sensor terminal identifier and in association with the collection time. In addition, the edge device overwrites the "previous data reception time" for the sensor terminal 102 in the management information (refer to FIG. 3) with the collection time of the current data. In addition, the edge device executes a predetermined type of analysis processing using the stored data and, for example, transmits a processing result to the analysis server 106 together with the collected data.

The edge device executes follow-up processing separately from such data collection processing. In the follow-up processing, an action of requesting reaction for enabling data collection from the sensor terminal 102 to the user of the sensor terminal 102 from which the most recent data cannot be collected is performed. For example, the follow-up processing is executed at a predetermined timing between periodic data collection timings. In addition, in the follow-up processing, first, data collection from the sensor terminal 102 from which the most recent data cannot be collected may be retried, and the above action may be executed in a case where data cannot be collected even in the retrying.

Figure 4:
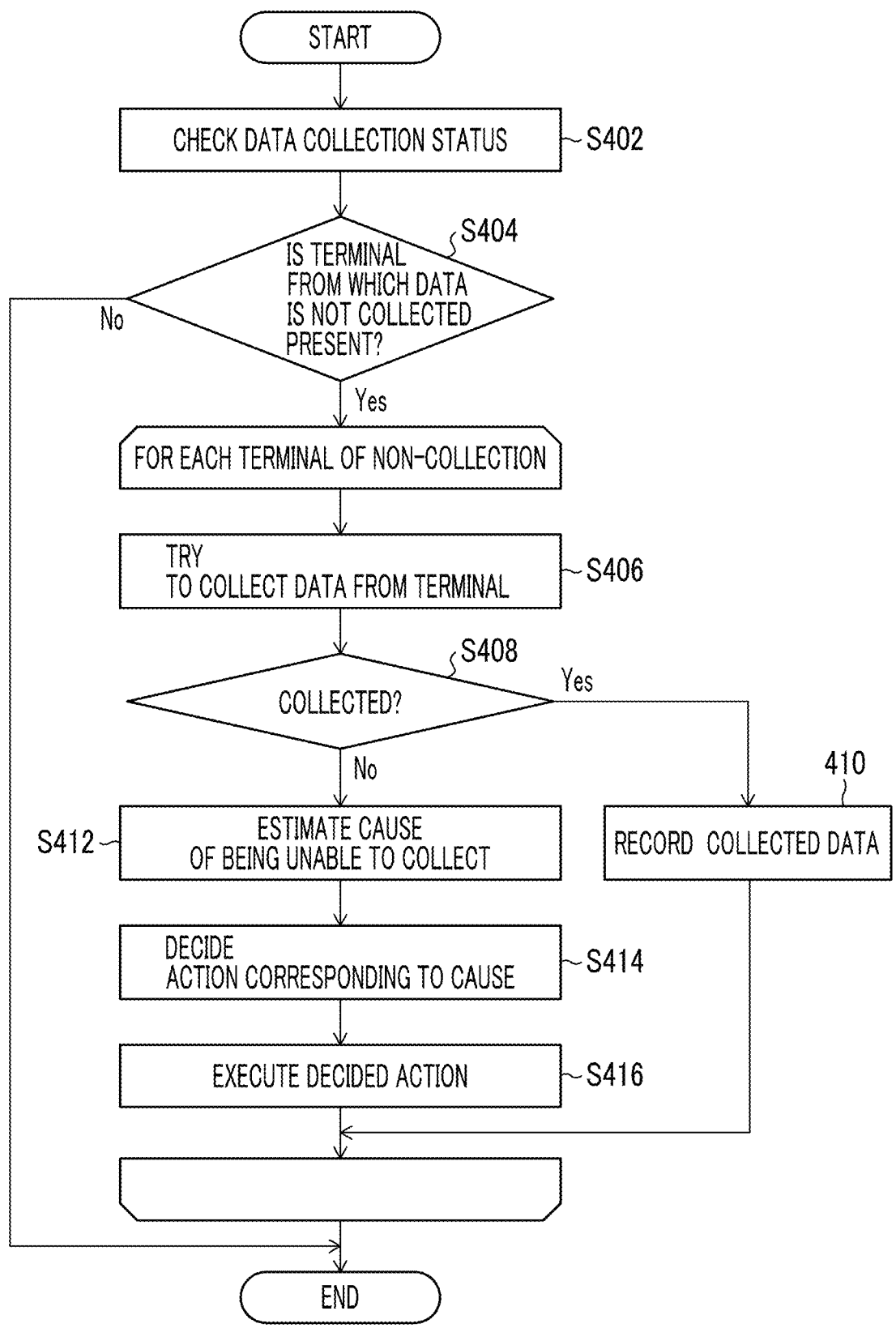
FIG. 4 is a diagram illustrating an example of a processing procedure of the edge device.

FIG. 4 illustrates an example of a procedure of the follow-up processing that is executed when a timing of the follow-up processing is reached. In this procedure, the edge device checks the management information (S402) and determines whether or not the sensor terminal 102 of which the most recent data is not collected is present (S404). For example, data collection is assumed to be executed every hour, and the management information illustrated in FIG. 3 is assumed at a time of 15:30 on 17 December at which the follow-up processing is executed. In this case, the edge device determines that the most recent data is already collected from the sensor terminals 102 of users "A" and "D", and that the most recent data is not collected from the sensor terminals 102 of users "B" and "C".

In a case where a determination result of step S404 is No, that is, in a case where collection of the most recent data is completed for all sensor terminals 102 of the management target, this processing is finished.

In a case where the determination result of step S404 is Yes, the edge device executes processing of steps S406 to S416 for each sensor terminal 102 from which the most recent data is not collected. That is, the edge device tries to recollect data from the sensor terminal 102 (S406). This recollection may be performed using the same method as the collection in the data collection processing. Next, the edge device determines whether or not the recollection is successful (S408). In a case of successful recollection, the edge device records the collected data in the database, performs analysis using the data, and transmits an analysis result and the collected data to the analysis server 106 (S410).

In a case where collection of data fails in step S408, the edge device estimates a cause of failure (S412).

There are broadly three cases of collection failures. Three cases include (a) a case where the most recent data cannot be acquired while communication with the sensor terminal 102 is performed, (b) a case where communication cannot be performed with the relay apparatus 108 that is used for relaying in a case of the previous data collection from the sensor terminal 102, and (c) a case where communication cannot be performed with the sensor terminal 102. In the case (a), occurrence of any anomaly in a part of the sensor terminal 102 other than a communication function is considered. The case (c) does not include a case where data cannot be collected from the sensor terminal 102 before the relay apparatus 108 as a result of being unable to communicate with the relay apparatus 108. That is, the case (c) includes the following two cases. One is a case where data cannot be collected using the same communication method as the previous collection from the sensor terminal 102 from which data is previously collected by the edge device not via the relay apparatus 108. Another one is a case where while communication is performed with the same relay apparatus 108 as the previous collection for the sensor terminal 102 from which data is previously collected by the edge device via the relay apparatus 108, the relay apparatus 108 cannot communicate with the sensor terminal 102.

In the present exemplary embodiment, for the case (c) of the cases, several causes of failure of data collection are considered depending on a behavior of the user. Meanwhile, for the cases (a) and (b), the cause of the former is apparently anomaly in the sensor terminal 102, and the cause of the latter is apparently anomaly in the relay apparatus 108. Thus, further classification of the cause based on the behavior of the user may not be performed.

For the case (c), for example, the cause is classified in accordance with a rule illustrated in FIG. 5 by referring to information related to the behavior of the user. Classification of a detailed cause in the case (c) is performed in a case where the cases (a) and (b) are known to be not applicable.

In the example in FIG. 5, a "sensor information collection history of the current day", a "multifunction peripheral job history of the current day", and the "schedule information" are considered as the information related to the behavior of the user.

The "sensor information collection history of the current day" is a history of data collection from the sensor terminal 102 of a determination target on the current day, and information of this history is stored in the edge device. Presence of the history of data collection from the sensor terminal 102 carried by the user on the current day indicates the behavior of the user such that the user is present on the current day at a location where data can be collected.

The "multifunction peripheral job history of the current day" is a usage history of the multifunction peripheral 104 on the current day for the user carrying the sensor terminal 102, and can be acquired from the multifunction peripheral 104 or a management system of a multifunction peripheral usage history on the network of the office. Usage of the multifunction peripheral 104 includes both of local usage and remote usage of the multifunction peripheral 104. The local usage is usage of a type in which the multifunction peripheral 104 is caused to execute a type of job accompanying a direction operation for the multifunction peripheral 104. For example, the direct operation for the multifunction peripheral 104 is an operation of the user for a local user interface (for example, the touch panel) of the multifunction peripheral 104. One example of the "type of job accompanying the direct operation" is, for example, a copy or scan job. The remote usage is providing a usage instruction to the multifunction peripheral 104 via the network. For example, a case of transmitting a print job to the multifunction peripheral 104 from the PC is an example of the remote usage. Presence of a history of usage of the multifunction peripheral 104 by the user carrying the sensor terminal 102 on the current day indicates the behavior of the user such that the user is present at the office on the current day.

The "schedule information" is the schedule of the user in a time frame including a time of failure of data collection and is obtained from the schedule of the user registered in the groupware server 110. This schedule information also indicates the behavior of the user.

In the example in FIG. 5, three causes including "absent", "temporarily absent", and "unable to acquire while normally on duty" are exemplified as the cause of data collection failure corresponding to the case (c).

Here, "absent" indicates that the user of the sensor terminal 102 is absent on the current day. In this case, the user is not present at the office on the current day. A determination that "absent" is the cause is made in a case where all of the following three matters are established. That is, a first matter is that the history of data collection from the sensor terminal 102 of a certain user on the current day is not present. A second matter is that the history of usage of the multifunction peripheral 104 by the user is not present. A third matter is that the schedule of the user on the current day registered in the groupware server 110 indicates absence for the whole day.

Even in a case where the schedule of the user registered in the groupware server 110 indicates absence for the whole day, the determination of "absent" may not be made in a case where the history of data collection from the sensor terminal 102 of the user on the current day is present, or in a case where the history of usage of the multifunction peripheral 104 by the user on the current day is present.

In addition, "temporarily absent" exemplified as the cause in the rule in FIG. 5 is a state where data cannot be collected from the sensor terminal 102 of the user because the user is present at a different location from the normal location due to the behavior in accordance with the schedule of the user. In a case where the user is present at the normal location, data can be collected from the sensor terminal 102 of the user using the previous data communication method (or the normal data communication method). However, in a case where the user is present at a different location in accordance with the schedule, data cannot be collected using the previous or normal data communication method. A determination that "temporarily absent" is the cause of data collection failure is made in a case where all of the following three matters are established. That is, a first matter is that the history of data collection from the sensor terminal 102 of a certain user on the current day is present. A second matter is that the history of usage of the multifunction peripheral 104 by the user is present. A third matter is that a schedule indicating that the user is present at a different location from the normal location in the time frame including the time of failure of data collection is registered in the groupware server 110. While the determination of "temporarily absent" is made in a case where all of the first to third matters are established, the determination of "temporarily absent" may be made in a case where at least one of the first or second matter is established, and where the third matter is established.

In addition, "unable to acquire while normally on duty" exemplified as the cause in the rule in FIG. 5 is a state where data cannot be collected from the sensor terminal 102 of the user because the user is estimated to be at the normal location. A determination that "unable to acquire while normally on duty" is the cause of data collection failure is made in a case where all of the following three matters are established. That is, a first matter is that the history of data collection from the sensor terminal 102 of a certain user on the current day is present. A second matter is that the history of usage of the multifunction peripheral 104 by the user is present. A third matter is that the schedule of the user in the time frame including the time of failure of data collection is not registered in the groupware server 110, or that even in a case where the schedule of the user in the time frame is registered, the schedule indicates that the user is present at the normal location. While the determination of "unable to acquire while normally on duty" is made in a case where all of the first to third matters are established, the determination of "unable to acquire while normally on duty" may be made in a case where at least one of the first or second matter is established, and where the third matter is established.

In a case where a combination of three of the "sensor information collection history of the current day", the "multifunction peripheral job history of the current day", and the "schedule information" does not correspond to any of "absent", "temporarily absent", and "unable to acquire while normally on duty" illustrated in FIG. 5, the cause of collection failure may be classified as "other".

In step S412 of the procedure in FIG. 4, the edge device determines whether the case (a) or (b) is applicable from a communication connection state with the sensor terminal 102 or the relay apparatus 108 in step S406. In a case where any of the cases (a) and (b) is not applicable, for example, the detailed cause in the case (c) is estimated in accordance with the rule in FIG. 5 by referring to a data collection history of the edge device, a job history of the multifunction peripheral 104, and the schedule information of the groupware server 110.

Next, the edge device decides an action to be executed on the sensor terminal 102 by the edge device in accordance with the estimated cause (S414). The action to be executed by the edge device includes notification to the user of the sensor terminal 102. This notification has a content that prompts the user to react to a status of being unable to collect data from the sensor terminal 102. A content of the reaction changes depending on the cause of failure of data collection. Thus, the content of notification to the user depends on the estimated cause.

In a case where notification to the user is regarded as a default action, "no notification" can also be regarded as one action.

For example, in a case where the estimated cause is "absent", the corresponding action is "no notification". In a case of absence, the user may not react during the current day, and obviously, data cannot be collected from the sensor terminal 102 of the user on the current day.

In a case where the cause is "temporarily absent", the corresponding action is transmission of notification to the user. This notification to be transmitted includes a message that has a content describing a behavior that the user is to perform for data collection with respect to the schedule which is the cause of "temporarily absent". For example, this message is "Information of the sensor cannot be collected, and thus, please transmit information after a preliminary meeting is finished." (hereinafter, referred to as Message 1) or "Information of the sensor cannot be collected, and thus, please connect to a multifunction peripheral (IP address=192.168 . . . ) or a relay apparatus (BD address=11:22:33: . . . ) near a conference room." (hereinafter, referred to as Message 2). Message 1 has a content that requests the user to transmit data of the sensor terminal 102 after the schedule (in this case, the "preliminary meeting") which is the cause of "temporarily absent" is finished. Message 2 has a content that requests connection of the sensor terminal 102 to an apparatus (for example, the multifunction peripheral or the relay apparatus) in or near the conference room where the "preliminary meeting is held. Message 2 includes information (in the above example, the IP address and the BD address) for specifying the multifunction peripheral or the relay apparatus in or near the conference room. Information of the title "preliminary meeting" of the schedule and the "conference room" of a venue of an event of the schedule included in Messages 1 and 2 may be acquired from the groupware server 110. Information of the multifunction peripheral or the relay apparatus in or near the "conference room" may be acquired from a database (not illustrated) that manages information of arrangement of devices in the office.

In a case of "temporarily absent", the user is highly likely to return to the normal location after the schedule which is the cause is finished, and the edge device can collect data from the sensor terminal 102 in a case where the user returns to the location. Therefore, as a different example from above, the action of the edge device in a case of "temporarily absent" may be set as "no notification".

In a case where the cause is "unable to acquire while normally on duty", the corresponding action is transmission of notification to the user. This notification has a content corresponding to a status of the cause of "unable to acquire while normally on duty". In this case, the cause is neither anomaly in the sensor terminal 102 or the relay apparatus 108 nor the schedule of the user. An event in which the sensor terminal 102 cannot perform BLE communication with the relay apparatus 108 or the multifunction peripheral 104 for a reason such that the user is temporarily away from the seat of the user, or that the relay apparatus 108 is moved from a usual location due to any circumstances is considered. In this case, the message included in the notification has a content that prompts the user to perform a behavior for addressing such an event. For example, the message is "Information of the sensor cannot be collected, and thus, please transmit data by connecting to the relay apparatus (BD address=11:22:33 . . . ) or connecting to Wi-Fi (registered trademark) Direct (SSID= . . . ) of the multifunction peripheral." or "Information of the sensor cannot be collected, and thus, please approach the multifunction peripheral.".

The action in a case where a determination of the case (a) is made is notification, to the user, of a message requesting reaction to anomaly possibly occurring in the sensor terminal 102. For example, the content of the message may be "There is a possibility of occurrence of anomaly in the sensor. Please check a state of the sensor.".

The action in a case where a determination of the case (b) is made is notification, to the user, of a message requesting reaction to anomaly possibly occurring in the relay apparatus 108. For example, the content of the message may be "There is a possibility of occurrence of anomaly in the relay apparatus. Please check the relay apparatus or connect to a different relay apparatus (BD address=11:22:33 . . . ).". As the "different relay apparatus" included in this message, the relay apparatus 108, other than the relay apparatus 108 used in the previous or normal data communication method, that is already paired with the sensor terminal 102 may be suggested.

Returning to the description of FIG. 4, in a case where the action is decided in step S414, the edge device executes the action (S416). Accordingly, processing for one sensor terminal 102 is completed.

While history information as to whether or not the multifunction peripheral 104 is used on the current day is referred to for determining the cause in the rule illustrated in FIG. 5, a further detailed history content may be referred to. For example, the further detailed history content is the type of job. Jobs that can be executed by the multifunction peripheral 104 include a local job such as the copy and scan jobs in which the user directly operates the multifunction peripheral 104, and a remote job such as the print job in which an instruction is provided to the multifunction peripheral 104 via the network.

In a case where history information indicating that the user of a certain sensor terminal 102 executes the local job in the multifunction peripheral 104 during a period from the most recent data collection timing to the present is present, the edge device among the multifunction peripherals 104 can collect data from the sensor terminal 102 during the period. However, in a case where the most recent data is not collected from the sensor terminal 102, and where the user does not have a schedule of absence or being at a different location, the cause of non-collection can be determined as anomaly in the sensor terminal 102. In this case, notification requesting to check a state of the sensor terminal 102 may be transmitted to the user in the same manner as the case (a).

In a case where history information indicating that the user of a certain sensor terminal 102 executes the remote job in the multifunction peripheral 104 during the period from the most recent data collection timing to the present is present, the user is present at the office during the period and is highly likely to be currently present at the office. Accordingly, in this case, in a case where the most recent data is not collected from the sensor terminal 102, and where the user does not have a schedule of absence or being at a different location, the cause of non-collection can be determined as "unable to acquire while normally on duty" described above. In this case, the edge device may transmit notification corresponding to the cause as illustrated above to the user.

In the above example, information of the seat occupancy management system 112 may be used for determining the cause of being unable to collect data. In a case where data cannot be collected from the sensor terminal 102 of the user regardless of presence of the user in the seat of the user based on the information of the seat occupancy management system 112 (furthermore, regardless of absence of anomaly in the relay apparatus 108), a determination that anomaly occurs in the sensor terminal 102 can be made. In this case, the edge device transmits notification requesting to check the state of the sensor terminal 102 to the user. In a case where absence of the user in the office is known from the information managed by the seat occupancy management system 112, the notification may not be transmitted when data cannot be collected from the sensor terminal 102 of the user, in the same manner as a case where the schedule of the user is absence for the whole day. In a case where presence, in the office, of the user of the sensor terminal 102 from which data cannot be collected is known from the seat occupancy management system 112, and where the user does not have such a schedule, the cause of non-collection of data can be determined as "unable to acquire while normally on duty". In a case where the location, in the office, of the user of the sensor terminal 102 from which data cannot be collected is known from the seat occupancy management system 112, the notification may have a content requesting the user to transmit information of the sensor terminal 102 by coming close to the relay apparatus 108 or the multifunction peripheral near the location.

In the above exemplary embodiment, the action corresponding to the cause is performed on the sensor terminal 102 from which data is not collected, in the processing in FIG. 4 that is performed after periodic data collection. However, the processing in FIG. 4 may be periodically performed without performing data collection.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to
        try to collect information from a terminal carried by a user;
        estimate a cause of being unable to collect the information from the terminal according to a presence or absence of schedule information of the user, a presence or absence of a sensor information collection history and a presence or absence of a multifunction peripheral job history in a case where the information is unable to be collected from the terminal, wherein the schedule information of the user, the sensor information collection history and the multifunction peripheral job history are included in information related to a behavior, the sensor information collection history indicates a history of data collected from the terminal carried by the user at the location, and the multifunction peripheral job history indicates a usage history of the information processing apparatus for the user carrying the terminal;
        control notification to the user based on the information related to the behavior of the user and the cause of being unable to collect the information in the case where the information is unable to be collected from the terminal, wherein the content of the notification changes according to the cause of being unable to collect the information from the terminal,
    wherein in a case where the schedule information indicates that the user is scheduled to be currently present at a location at which the information cannot be collected from the terminal, the notification transmitted to the user by the processor includes information for specifying an apparatus that is capable of relaying communication between the terminal and the information processing apparatus and is present near the location at which the user is scheduled to be currently present, and the notification further includes a content that requests connection of the terminal to the apparatus that is capable of relaying the communication between the terminal and the information processing apparatus;
    wherein the processor is further configured to:
        not transmit the notification to the user in response to an absence of the schedule information, an absence of the sensor information collection history and an absence of the multifunction peripheral job history;
        transmit the notification to the user in response to a presence of the schedule information, a presence of the sensor information collection history and a presence of the multifunction peripheral job history, wherein the content of the notification includes a content describing a behavior that the user is to perform for data collection; and
        transmit the notification to the user in response to the absence of the schedule information, the presence of the sensor information collection history, and the presence of the multifunction peripheral job history, wherein the content of the notification prompts the user to perform a behavior for addressing such an event.

2. The information processing apparatus according to claim 1,
    wherein the processor is configured to, in the case where the schedule information indicates that the user is scheduled to be currently present at the location at which the information cannot be collected from the terminal, transmit the notification having a different content from an opposite case to the user.

3. The information processing apparatus according to claim 1,
    wherein the information related to the behavior further includes a usage history of a device by the user.

4. The information processing apparatus according to claim 3,
    wherein the information processing apparatus is incorporated in the device, and
    the processor is configured to
        transmit notification having a content requesting to check a state of the terminal to the user in a case where the usage history indicates that the user has used a type of operation that causes the device to execute processing of a type of function during a period in which collection of the information is tried in a case where the information is not collected from the terminal, wherein the type of operation is a direct operation of the device.

5. The information processing apparatus according to claim 1,
    wherein the information related to the behavior further includes information on seat occupancy or absence of the user managed by a seat occupancy management system.

6. A non-transitory computer readable medium storing a program causing a computer to execute a process, the process comprising:
    trying to collect information from a terminal carried by a user;
    estimating a cause of being unable to collect the information from the terminal according to a presence or absence of schedule information of the user, a presence or absence of a sensor information collection history and a presence or absence of a multifunction peripheral job history in a case where the information is unable to be collected from the terminal, wherein the schedule information of the user, the sensor information collection history and the multifunction peripheral job history are included in information related to a behavior, the sensor information collection history indicates a history of data collected from the terminal carried by the user at the location, and the multifunction peripheral job history indicates a usage history of the computer for the user carrying the terminal;

controlling notification to the user based on the information related to the behavior of the user and the cause of being unable to collect the information in the case where the information is unable to be collected from the terminal, wherein the content of the notification changes according to the cause of being unable to collect the information from the terminal, wherein in a case where the schedule information indicates that the user is scheduled to be currently present at a location at which h the information cannot be collected from the terminal, the notification transmitted to the user by the computer includes information for specifying an apparatus that is capable of relaying communication between the terminal and the computer and is present near the location at which the user is scheduled to be currently present, and the notification further includes a content that requests connection of the terminal to the apparatus that is capable of relaying the communication between the terminal and the computer;

not transmitting the notification to the user in response to an absence of the schedule information, an absence of the sensor information collection history and an absence of the multifunction peripheral job history;

transmitting the notification to the user in response to a presence of the schedule information, a presence of the sensor information collection history and a presence of the multifunction peripheral job history, wherein the content of the notification includes a content describing a behavior that the user is to perform for data collection; and transmitting the notification to the user in response to the absence of the schedule information, the presence of the sensor information collection history, and the presence of the multifunction peripheral job history, wherein the content of the notification prompts the user to perform a behavior for addressing such an event.

7. An information processing apparatus comprising:

means for trying to collect information from a terminal carried by a user;

means for estimating a cause of being unable to collect the information from the terminal according to a presence or absence of schedule information of the user, a presence or absence of a sensor information collection history and a presence or absence of a multifunction peripheral job history in a case where the information is unable to be collected from the terminal, wherein the schedule information of the user, the sensor information collection history and the multifunction peripheral job history are included in information related to a behavior, the sensor information collection history indicates a history of data collected from the terminal carried by the user at the location, and the multifunction peripheral job history indicates a usage history of the information processing apparatus for the user carrying the terminal;

means for controlling notification to the user based on the information related to the behavior of the user and the cause of being unable to collect the information in the case where the information is unable to be collected from the terminal, wherein the content of the notification changes according to the cause of being unable to collect the information from the terminal, wherein in a case where the schedule information indicates that the user is scheduled to be currently present at a location at which the information cannot be collected from the terminal, the notification transmitted to the user includes information for specifying an apparatus that is capable of relaying communication between the terminal and the information processing apparatus and is present near the location at which the user is scheduled to be currently present, and the notification further includes a content that requests connection of the terminal to the apparatus that is capable of relaying the communication between the terminal and the information processing apparatus;

means for not transmitting the notification to the user in response to an absence of the schedule information, an absence of the sensor information collection history and an absence of the multifunction peripheral job history;

means for transmitting the notification to the user in response to a presence of the schedule information, a presence of the sensor information collection history and a presence of the multifunction peripheral job history, wherein the content of the notification includes a content describing a behavior that the user is to perform for data collection; and means for transmitting the notification to the user in response to the absence of the schedule information, the presence of the sensor information collection history, and the presence of the multifunction peripheral job history, wherein the content of the notification prompts the user to perform a behavior for addressing such an event.

* * * * *